United States Patent Office 2,956,857
Patented Oct. 18, 1960

2,956,857

METHODS OF DECOMPOSING COMPLEX URANIUM-RARE EARTH TANTALO-COLUMBATES

John R. Ruhoff, Webster Groves, and Charles O. Gerfen, Brentwood, Mo., and George B. Wills, Madison, Wis., assignors to Mallinckrodt Chemical Works, St. Louis, Mo., a corporation of Missouri No Drawing. Filed Nov. 25, 1957, Ser. No. 698,333

3 Claims. (Cl. 23—14.5)

The present invention relates to mineral decomposition and more particularly to methods of decomposing complex uranium-rare earth tantalo-columbates which also contain substantial amounts of titanium and recovering a columbium-tantalum concentrate substantially free from rare earths.

Briefly, the method of the present invention comprises adding an aqueous slurry of a finely milled uranium-rare earth tantalo-columbate to an aqueous sodium hydroxide solution having a concentration between 35% and 80% by weight and digesting the mixture at a temperature between 122–220° C. to form a mixture of a caustic liquor and a residue containing uranium, earth acid and rare earth values. This residue is then separated from the caustic liquor and hydrochloric acid is added in excess to form an aqueous acidified mixture having a free acid concentration of between about 0.5–1.5 N. This acidified mixture is heated to form a solid concentrate of the earth acid values and an aqueous concentrate of uranium and the rare earth values.

Among the several objects of this invention may be noted the provision of methods for decomposing complex uranium-rare earth tantalo-columbates which contain substantial amounts of titanium (e.g., more than about 5%) and recovering tantalum-columbium concentrates, substantially free from the rare earths and uranium, and uranium concentrates substantially free from columbium and tantalum; the provision of methods of the character described which are capable of substantially quantitative recovery of the metal values contained in said complex; the provision of methods of the character described which can be carried out using conventional equipment and manufacturing techniques; the provision of methods of the character described which provide rare earth and columbium-tantalum concentrates suitable for processing by known methods; the provision of methods of the character described which effect substantially complete separation of columbium and tantalum from uranium and the rare earth elements; and the provision of the methods of the character described which are economical and efficient and which are suitable for commercial manufacture. Other objects and features will be in part apparent and in part pointed out hereinafter.

The invention accordingly comprises the methods hereinafter described, the scope of the invention being indicated in the following claims.

A large number of tantalo-columbates are found widely distributed in nature. Economically the most important of these have been the simple tantalo-columbates of iron and manganese, columbite and tantalite. These minerals contain only small amounts of other elements and efficient methods are known for processing them. With the increasing importance of columbium and tantalum as strategic metals, other more complex tantalo-columbates have achieved importance. Chief among these are the tantalo-columbates of uranium and the rare earths, examples of which are fergusonite, euxenite, polycrase, samarskite, betafite, etc. While economical and efficient methods are available for processing many simpler rare earth and tantalo-columbate minerals they are unsatisfactory when applied to more complex minerals and the special methods proposed heretofore for processing the latter are cumbersome and inefficient.

The complex nature of these minerals is shown by Idaho Euxenite whose composition is typically as follows:

| Constituent: | Percent |
|---|---|
| $(Cb, Ta)_2O_5$ | 16–32 |
| $TiO_2$ | 15–27 |
| $U_3O_8$ | 5–11 |
| Rare earth oxides ($RE_2O_3$) | 14–20 |
| $Fe_2O_3$ | 4–14 |
| $ThO_2$ | 1–4 |
| CaO | 1–3 |
| $Al_2O_3$ | 1–4.5 |
| $SiO_2$ | 1–9 |
| MnO | 0.5–2.5 |
| $P_2O_5$ | 0.1–3 |
| Loss on ignition | 0.5–2 |

A principal difficulty in decomposing such minerals is caused by the fact that some of these elements lose much of their individuality in each other's presence, making their separation by known processes extremely tedious if not impossible. For example, sodium columbate and sodium tantalate which are normally soluble in hot water are much less soluble in the presence of titanium, possibly because of the formation of titano complexes. Many other obscure and unpredictable combinations of these elements are possible. Thus, many schemes for separating these elements, which appear to be sound according to accepted chemical knowledge, completely fail to give the expected results when actually tried.

Another difficulty is caused by the fact that the amount of any particular element in these minerals is usually low and many of the elements are of little or no economic value. Therefore to be economically feasible the recovery of those elements which are economically valuable must be nearly quantitative.

In accordance with the present invention a finely milled ore such as euxenite is reacted with an aqueous solution of a strong caustic (i.e., sodium or potassium hydroxide) at a temperature between 122° C. and the boiling point of a concentrated caustic solution to decompose or crack the complex tantalo-columbate. The reaction mixture consisting of a caustic liquor and an insoluble residue is then preferably aged at a concentration of 17%–30% by weight of sodium hydroxide in the caustic liquor and at a temperature between about 70° C. and its boiling temperature to complete the reaction and improve the filterability of the reaction product. The caustic liquor is then separated from an insoluble residue containing the columbium, tantalum, titanium, uranium and rare earth values. This residue is suspended in water and treated with hydrochloric acid in the presence of a small amount of sulfate to dissolve the rare earth and uranium values leaving an insoluble residue containing substantially all of the columbium and tantalum. The insoluble residue is then separated from the acid liquor to obtain a concentrate of columbium and tantalum which is substantially free from rare earth elements. The acid liquor represents a concentrate of the uranium values suitable for further processing.

More particularly, in the practice of the present invention it is preferred to add the tantalo-columbate ore to the hot caustic solution in the form of an aqueous slurry. The slurry may be prepared by grinding the raw ore with water in a ball mill or other suitable grinding device, the amount of water used being just sufficient to provide a fluid mixture. The finer the particle size the more quickly and completely the ore will be cracked.

The caustic digestion of the ore can be carried out over a wide range of temperatures and concentrations. At atmospheric pressures the concentration of the caustic of course limits the digestion temperature. In general, the concentration of sodium hydroxide may be varied between 35% and 80% with the reaction temperature lying between about 122° C. to 220° C. The amount of caustic required is essentially that necessary to react with the acid oxides formed during the digestion, e.g., the oxides of columbium, tantalum, titanium, and silicon plus sufficient excess to provide a stirrable mixture. At a caustic concentration of 30% sodium hydroxide about one part by weight of sodium hydroxide per part by weight of ore on a dry basis is sufficient. At higher concentrations proportionately more caustic solution and higher temperatures are necessary to obtain equivalent fluidity. For example, at a caustic concentration of 80% from 2–4 parts by weight of sodium hydroxide per part by weight of ore are usually necessary and the digestion temperature should be above about 170° C.

If the caustic digestion is carried out at a concentration substantially exceeding about 30% sodium hydroxide, it has been found that filtration of the reaction mixture is very slow and tedious. If, however, the reaction mixture is first diluted to a concentration of 17%–30% by weight of sodium hydroxide in the caustic liquor and heated for several hours, the mixture undergoes a transformation and filtration is greatly facilitated. The exact nature of this transformation is not fully understood. It is accompanied by a small but appreciable change in the color of the slurry and by an increase in its free caustic content. Whatever the explanation, it has been observed that on heating the diluted slurry the filterability begins to improve after several hours and the improvement continues for some time. Maximum improvement is usually reached within twelve hours.

In general it is preferred to operate at as low temperatures and concentrations as possible to minimize corrosion problems and avoid the necessity of concentrating large amounts of dilute caustic filtrates so they can be recycled. To avoid excessive digestion times or incomplete cracking it is important to mill the raw ore as fine as possible within practical limits. Grinding the ore for 12–24 hours in an efficient ball mill is satisfactory, but other methods of grinding the ore may of course be employed.

The cracked ore is now filtered and washed with weak caustic and/or water, the caustic filtrates being used to wash subsequent batches or concentrated for use in cracking subsequent batches of core. In this manner, sodium hydroxide is conserved and small quantities of valuable materials dissolved or suspended in the caustic are recovered.

The cracked ore now consists essentially of a mixture of acid soluble oxides and salts of uranium, thorium and the rare earths and acid-insoluble salts of the earth acids. The term "earth acids" is used here as a convenient designation for the oxides of the elements columbium, tantalum, titanium, and silicon which have a strong tendency to form anionic radicals. If, however, hydrochloric acid alone is used to leach out the acid soluble values, a gelatinous slurry is obtained, possibly due to the presence of titanium complexes. In any event the obstacle can be overcome by leaching the cracked ore in the presence of sulfate ions. A sulfate concentration in the neighborhood of 0.05 to 0.5 M is usually adequate. Higher concentrations are usually to be avoided since they may interfere with later separations. The sulfate ions may be supplied in the form of any convenient soluble sulfate salt such as ammonium sulfate or an alkali metal sulfate. Preferably, however, the sulfate ions are supplied by addition of sulfuric acid.

Digestion of the ore is preferably carried out at boiling or near boiling temperatures so as to solubilize all of the uranium. A free acid concentration of 0.5 N to 1.5 N is preferred. Under these conditions substantially all of the uranium, thorium and rare earths are solubilized, and the insoluble residue contains only negligible amounts of these values. The acid liquor also contains almost all of the iron. The insoluble residue is separated from the acid liquor using a filter-press or other suitable device, and thoroughly washed to recover all of the uranium.

The filter cake from the acid digestion consists essentially of the hydrous oxides of the earth acids, columbium, tantalum, titanium, and silicon, along with traces of phosphates and other acid insoluble substances. It also contains 1–4% sulfate. If the latter is objectionable, it can be removed by washing the cake with dilute ammonia, a concentration of 1–5% being sufficient. The ammonia wash is also effective in reducing the chloride content of the cake to an insignificant amount.

The earth acid concentrate may be processed further by known methods to separate and recover the columbium, tantalum, and titanium values. Particularly advantageous methods of doing this are disclosed in Patents 2,819,945, dated January 14, 1958, 2,850,098, dated November 4, 1958, 2,859,099, dated November 4, 1958, 2,816,815, dated December 17, 1957, 2,819,146, dated January 7, 1958, 2,895,792, dated July 21, 1959, and 2,895,793, dated July 21, 1959.

The acid mother liquor represents a concentrate of the uranium, thorium, rare earth and other base metal values and is substantially free from columbium and tantalum. Its values may be precipitated with sodium hydroxide to recover a solid concentrate, or the acid solution may be treated by other known methods for the separation and recovery of these values.

The methods described above thus effect a clean separation of uranium and related values from columbium, tantalum, titanium and other earth acids in a simple and efficient manner. All of the operations are carried out within temperature ranges and other operating conditions which permit the use of conventional and readily available equipment. By judicious recycling of filtrates very little of the values are lost and the consumption of reagents, particularly sodium hydroxide, can be held to a minimum.

The following examples further illustrate the invention.

*Example 1*

A solution of 50% sodium hydroxide containing 237.5 lbs. of sodium hydroxide was boiled down until the temperature of the boiling solution reached 220° C. To this hot caustic solution was gradually added an aqueous slurry of euxenite ore prepared by milling 95 lbs. of the ore in a ball mill with just enough water to provide a fluid composition. This represents a ratio of 2.5 parts by weight of sodium hydroxide per part by weight of ore on a dry basis. The reactor was closed to prevent undue loss of water by evaporation and the mixture was digested with stirring for 5 hours at 160–170° C. Upon completion of the digestion the ore was 98% cracked as determined by extractig a sample of the solids first with excess hydrochloric acid and then extracting the residue with excess hydrofluoric acid, the remaining insoluble residue representing uncracked ore. The reaction mixture was then quenched with 52 gallons of 13% sodium hydroxide and allowed to stand overnight at a temperature of about 80° C. The final volume of the slurry was 71 gallons and the sodium hydroxide concentration in the liquor was 30% by weight. The slurry was filtered on a drum filter, and washed by reliquor, adding hydrochloric acid to said residue to form an acidified aqueous mixture having a free acid concentration of between approximately 0.5–1.5 N, and heating the acidified mixture whereby a solid concentrate of the earth acid values and an aqueous concentrate of uranium and the rare earth values are formed.

2. The method comprising adding an aqueous slurry of a finely milled uranium-rare earth tantalo-columbate to an aqueous sodium hydroxide solution having a concentration of between approximately 35%–80% by weight, digesting said mixture at a temperature between approximately 122° C. and 220° C. to form a mixture of caustic liquor and a residue containing uranium, earth acid and rare earth values, diluting the caustic liquor to a concentration of between approximately 17%–30% by weight of sodium hydroxide, aging the diluted mixture at a temperature of at least 70° C., separating said residue from the caustic liquor, adding hydrochloric acid to said residue to form an acidified aqueous mixture having a free acid concentration of between approximately 0.5–1.5 N, and heating the acidified mixture whereby a solid concentrate of the earth acid values and an aqueous concentrate of uranium and the rare earth values are formed.

3. The method comprising adding an aqueous slurry of a finely milled uranium-rare earth tantalo-columbate containing at least approximately 5% by weight of titanium to an aqueous sodium hydroxide solution having a concentration of between approximately 35%–80% by weight, digesting said mixture at a temperature between approximately 122° C. and 220° C. to form a mixture of caustic liquor and a residue containing uranium, earth acid and rare earth values, diluting the caustic liquor to a concentration of between approximately 17%–30% by weight of sodium hydroxide, aging the diluted mixture at a temperature of at least 70° C., separating said residue by filtration from the caustic liquor, adding hydrochloric acid and sulfuric acid to said residue to form an acidified aqueous mixture having a sulfate ion concentration of approximately 0.05–0.5 M and a free acid concentration of between approximately 0.5–1.5 N, and heating the acidified mixture at approximately its boiling point whereby a solid concentrate of the earth acid values and an aqueous concentrate of uranium and the rare earth values are formed.

References Cited in the file of this patent

UNITED STATES PATENTS 2,815,264     Calkins et al. _____ Dec. 3, 1957

OTHER REFERENCES

Dickson et al.: "Extraction and Refining of the Rarer Metals," Symposium held in London Mar. 22–23, 1956, and this date relied on. Pages ix, x, 258–271. (Copy in Div. 46.) Stephen Austin & Sons, Ltd., Caxton Hill, Hartford, Great Britain (1957).

Koerrer et al.: "Separation of Niobium and Tantalum," ISC–793 AEC Research and Development Report, Aug. 15, 1956, pages 4–7.

Pierret et al.: "Caustic Fusion of Columbite-Tantalite Concentrates with Subsequent Separation of Niobium and Tantalum," ISC–796 AEC Research and Development Report August 1956, pages 4–7. (Copies available from the Office of Technical Services, U.S. Dept. of Commerce, Washington 25, D.C.)

slurrying it with 105 gallons of 3.58% sodium hydroxide and again filtering it. This washing procedure was repeated using 100 gallons of water. The dilute caustic filtrates from the second and third filtrations were saved for quenching and washing subsequent batches of ore. The more caustic filtrate from the first filtration was concentrated, boiled down to 143° C. (equivalent to 50% sodium hydroxide), the precipitated solids, consisting primarily of sodium carbonate along with small amounts of unreacted ore, were allowed to settle out and the clear supernatant caustic solution was decanted off and used for cracking subsequent batches of ore. The residue was suspended in water to dissolve the sodium carbonate, and the insoluble residue of uncracked ore was filtered off and recycled to the process to recover the values which it contains.

The filter cake from the final washing of the cracked ore was slurried with just enough water to provide a fluid, easily stirrable slurry and adjusted to pH 1 with 30% hydrochloric acid. Enough sulfuric acid was then added to make the slurry 0.15 M with respect to $SO_4^=$. The slurry was heated to 90° C. and the free acidity adjusted to 1 N with 30% hydrochloric acid. The acidified slurry was digested at 95° C. for twenty hours with the volume and free acidity maintained approximately constant by addition of acid or water as required. The acid slurry was cooled to 80° C. and filtered on a filter press. The filter cake was then washed on the press, first with dilute sulfuric acid (0.1 N) at 80° C., then water at 80° C., then cold 2% ammonia solution, and finally with water at 80° C.

The acid mother liquor and initial washings contained 98% of the uranium originally present in the cake while more than 99% of the columbium and tantalum were present in the filter cake which consisted essentially of a solid concentrate of earth acid oxides, principally columbium, tantalum, and titanium, suitable for further processing to recover pure columbium and tantalum oxides by known methods. Analysis of the wet solid concentrate showed the following composition:

| | Percent |
|---|---|
| $(Cb,Ta)_2O_5$ | 12.8 |
| $TiO_2$ | 11.3 |
| $SiO_2$ | 2.3 |
| $U_3O_8$ | 0.1 |
| $Fe_2O_3$ | 0.4 |
| $Cl^-$ | 0.04 |
| $SO_4^=$ | 1.0 |
| Loss on ignition | 73.3 |

The uranium, thorium and rare earths present in the acid liquor may be recovered as a solid concentrate by precipitating their hydroxides with sodium hydroxide, or the acid solution may be treated by other known methods for the separation and purification of these values.

*Example 2*

A 50.4% solution of sodium hydroxide equivalent to 240 lbs. of NaOH was boiled down to 195° C. To this hot concentrated caustic solution was gradually added a slurry of 80 lbs. of Idaho Euxenite prepared by milling the ore in a ball mill with just enough water to provide a fluid mixture. This represents a ratio of 3 parts by weight of sodium hydroxide per part by weight of ore on a dry basis. The slurry was then digested at 155–160° C. for 6 hours by which time cracking was 99% complete. At the end of the digestion period the slurry was quenched and diluted with 43 gallons of 3.7% sodium hydroxide.

Filtration of this slurry was very slow and unsatisfactory. When it was diluted to 150 volume percent with water and heated to boiling the rate of filtration was doubled. Merely boiling the slurry for an equivalent length of time without dilution or merely diluting the slurry without subsequent heat treatment did not improve the filtration rate. The treated slurry was filtered and washed as before. The cracked and washed ore was slurried in enough water to provide a fluid composition and digested with a mixture of 44 lbs. of 30% sulfuric acid and sufficient 30% hydrochloric acid to provide a free acidity of approximately 1 N. The acid slurry was then digested at 95° C. for 20 hours while the volume (approximately 69 gals.) and free acid content were maintained approximately constant by adding dilute hydrochloric acid or water as required. After the digestion period was completed the slurry was cooled to 65° C. and filtered on a filter press. The cake was then washed with dilute hydrochloric acid, water and ammonia as before. The wet filter cake had the following composition:

| | Percent |
|---|---|
| $(Cb,Ta)_2O_5$ | 20.6 |
| $SiO_2$ | 1.12 |
| $TiO_2$ | 9.42 |
| Rare earth oxides+$ThO_2$ | <0.01 |
| $U_3O_8$ | 0.35 |
| $Fe_2O_3$ | 0.31 |
| $Cl^-$ | 0.13 |
| $SO_4^=$ | 3.68 |
| Loss on ignition | 69.35 |

*Example 3*

A solution of 50.2% sodium hydroxide containing 220 lbs. of NaOH was boiled down until the temperature of the boiling solution reached 225° C. This is conveniently accomplished by first evaporating a portion of the caustic solution to about 180° C., maintaining this temperature during the gradual addition of the remainder of the caustic solution and then boiling until the desired temperature was reached. A slurry of African Euxenite, prepared by milling 110 lbs. of ore with water in a ball mill for 12 hours, was then added to the hot caustic while the temperature was maintained above 155–160° C. and the mixture was digested for 7 hours at 130–150° C. After completion of the digestion period a charge was quenched and diluted with 55 gallons of 11.5% sodium hydroxide solution to yield a slurry having approximately 170 gallons. By this procedure the ore was 99.6% cracked after 2½ hrs. of digestion. The cracked ore slurry was filtered, washed, digested with acid and then filtered and washed in a manner similar to that described in Examples 1 and 2 to recover a concentrate of earth acid oxides in an acid solution containing the uranium, thorium and rare earth values initially present in this ore.

*Example 4*

A portion of euxenite ore was cracked with 50% sodium hydroxide solution (2 parts sodium hydroxide per part by weight of ore on a dry basis) for 10 hours at 140° C. by a procedure similar to that described in Example 3. The ore was approximately 97% cracked. The cracked ore slurry was then filtered and leached with acid as hereinbefore described.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

We claim:
1. The method comprising adding an aqueous slurry of a finely milled uranium-rare earth tantalo-columbate to an aqueous sodium hydroxide solution having a concentration of between approximately 35%–80% by weight, digesting said mixture at a temperature between approximately 122° C. and 220° C. to form a mixture of caustic liquor and a residue containing uranium, earth acid and rare earth values, separating said residue from the caustic

UNITED STATES PATENT OFFICE
Certificate of Correction

Patent No. 2,956,857 October 18, 1960

John R. Ruhoff et al.

It is hereby certified that error appears in the above numbered patent requiring correction and that the said Letters Patent should read as corrected below.

Column 3, line 53, for "core" read —ore—; column 4, line 27, for the patent number "2,850,098" read —2,859,098—; line 66, for "extractig" read —extracting—; column 6, line 69, for "a finely milled uranium-rare earth tantalo-columbate to an" read —a finely milled uranium-rare earth tantalo-columbate containing at least approximately 5% by weight of titanium to an—; line 75, for "rare earth values, separating said residue from the caustic" read —rare earth values, diluting the caustic liquor to a concentration of between approximately 17%–30% by weight of sodium hydroxide, aging the diluted mixture at a temperature of at least 70° C., separating said residue by filtration from the caustic—; column 7, lines 1 and 2, for "liquor, adding hydrochloric acid to said residue to form an acidified aqueous mixture having a free acid concen-" read — liquor, adding hydrochloric acid and sulfuric acid to said residue to form an acidified aqueous mixture having a sulfate ion concentration of approximately 0.05–0.5 M and a free acid concen- —; line 4, for "the acidified mixture whereby a solid concentrate of the" read —the acidified mixture at approximately its boiling point whereby a solid concentrate of the—; same column 7, lines 14 to 17, inclusive, for "rare earth values, diluting the caustic liquor to a concentration of between approximately 17%–30% by weight of sodium hydroxide, aging the diluted mixture at a temperature of at least 70° C., separating said residue from" read —rare earth values, separating said residue from—; lines 25 and 26, for "a finely milled uranium-rare earth tantalo-columbate containing at least approximately 5% by weight of titanium" read —a finely milled uranium-rare earth tantalo-columbate—; column 8, line 3, beginning with "by" strike out all to and including "acid concentration" in line 7, same column, and insert instead —from the caustic liquor, adding hydrochloric acid to said residue to form an acidified aqueous mixture having a free acid concentration—; same column 8, line 9, for "acidified mixture at approximately its boiling point where-" read — acidified mixture where- —.

Signed and sealed this 16th day of May 1961.

[SEAL]
Attest:
ERNEST W. SWIDER,
*Attesting Officer.*

DAVID L. LADD,
*Commissioner of Patents.*